(12) United States Patent
Deprauw et al.

(10) Patent No.: US 12,402,567 B2
(45) Date of Patent: Sep. 2, 2025

(54) ADJUSTMENT ARRANGEMENT FOR OFFSET SPACING BETWEEN LOUVRES IN A SIEVE OF AN AGRICULTURAL HARVESTER

(71) Applicant: CNH Industrial America LLC, New Holland, PA (US)

(72) Inventors: Jonas Deprauw, Lauwe (BE); Kris Vanhee, Deinze (BE)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 731 days.

(21) Appl. No.: 17/747,371

(22) Filed: May 18, 2022

(65) Prior Publication Data
US 2022/0369561 A1 Nov. 24, 2022

(30) Foreign Application Priority Data
May 21, 2021 (EP) .................................... 21175441

(51) Int. Cl.
*A01F 12/44* (2006.01)
(52) U.S. Cl.
CPC ................................. *A01F 12/448* (2013.01)
(58) Field of Classification Search
CPC ..... A01F 12/228; A01F 12/446; A01F 12/448
(Continued)

(56) References Cited

U.S. PATENT DOCUMENTS 747,231 A * 12/1903 Rumely .................... B07B 1/12
209/394
1,331,614 A * 2/1920 Bradshaw ............. A01F 12/446
209/322
(Continued)

FOREIGN PATENT DOCUMENTS

DE 4313841 A1 * 11/1994 ............. A01F 12/40
EP 1849351 A1 10/2007
(Continued)

OTHER PUBLICATIONS

Extended European Search Report for European Application No. 21175441.1, dated Nov. 11, 2021, 7 pages.

*Primary Examiner* — Joseph M Rocca
*Assistant Examiner* — Sunny D Webb
(74) *Attorney, Agent, or Firm* — Buchanan Ingersoll & Rooney PC

(57) ABSTRACT

A sieve for use in an agricultural harvester includes first and second adjustment laths arranged longitudinally adjacent to each other. The first and second adjustment laths are movable in fore and aft directions relative to an air flow direction (Y) through the sieve. The first adjustment lath is connected with a first set of louvres and the second adjustment lath is connected with a second set of louvres. An adjustment arrangement for adjusting an offset spacing (X) between first and second sets of louvres includes a rotatable elongate element with a longitudinally facing stepped shoulder and a stop surface. The elongate element is connected with each of the first and second adjustment laths. The stepped shoulder includes a plurality of stepped surfaces which are selectively engagable with the at least one stop surface. The stepped surfaces respectively define incremental offset spacings (X) between the first and second set of louvres.

11 Claims, 6 Drawing Sheets

(58) Field of Classification Search
USPC .................................................. 460/101, 109
See application file for complete search history.

(56) References Cited

U.S. PATENT DOCUMENTS

| | | | | |
|---|---|---|---|---|
| 1,524,992 | A * | 2/1925 | Maxwell | A01F 12/446 |
| | | | | 209/394 |
| 4,897,072 | A * | 1/1990 | Bestland | A01F 12/448 |
| | | | | 460/99 |
| 5,525,108 | A * | 6/1996 | Rouse | A01F 12/448 |
| | | | | 460/101 |
| 7,371,162 | B2 * | 5/2008 | Matousek | A01F 12/448 |
| | | | | 460/101 |

FOREIGN PATENT DOCUMENTS

| | | | |
|---|---|---|---|
| EP | 2796032 | A2 | 10/2014 |
| EP | 3571920 | A1 | 11/2019 |

* cited by examiner

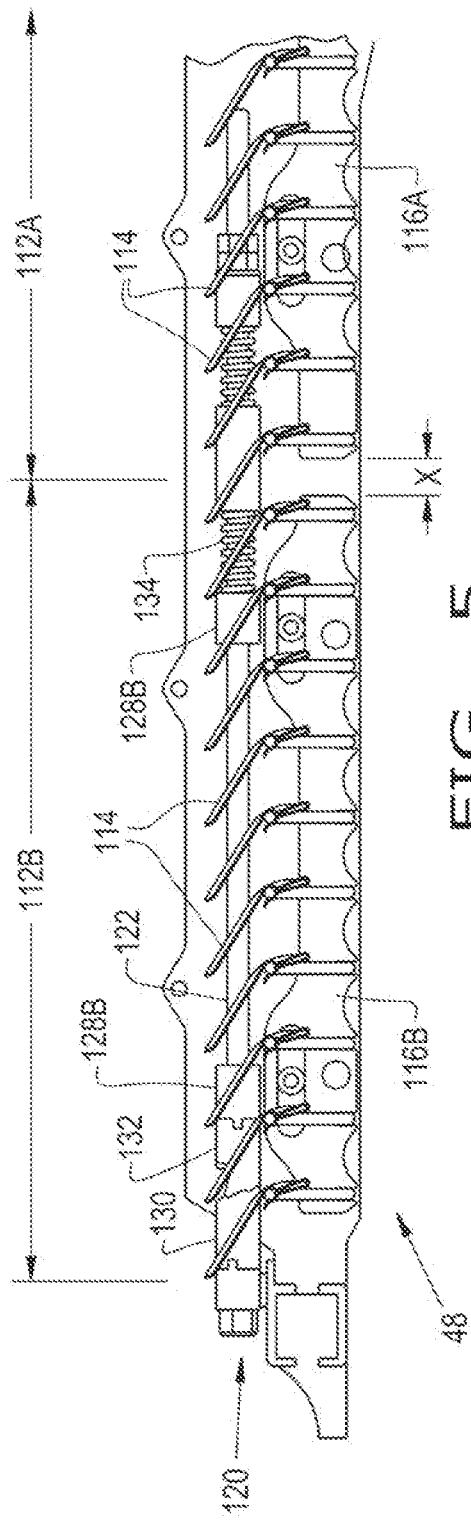
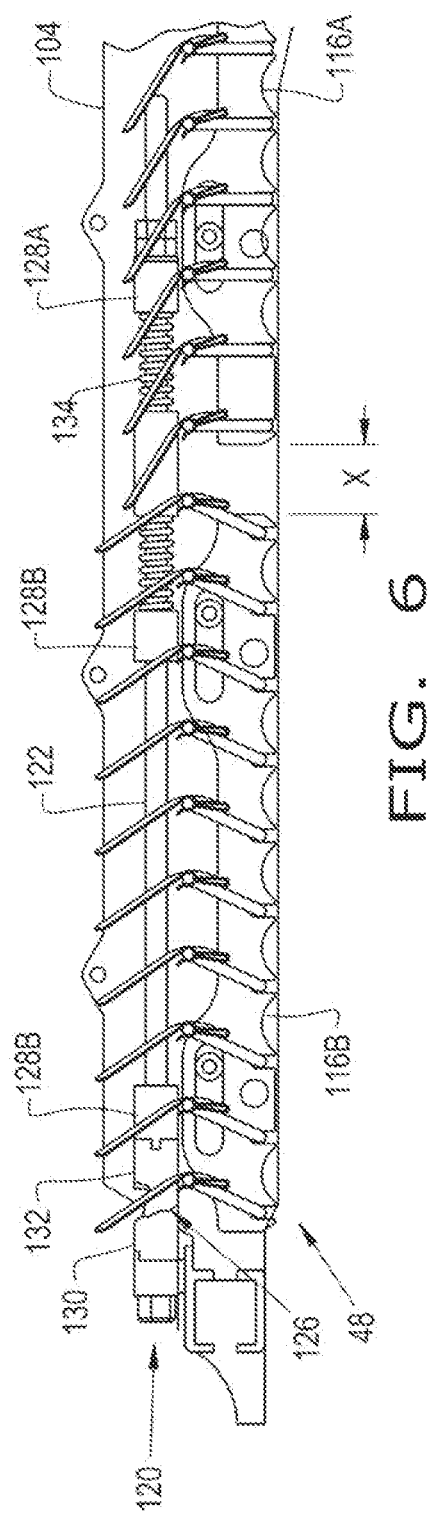

ADJUSTMENT ARRANGEMENT FOR OFFSET SPACING BETWEEN LOUVRES IN A SIEVE OF AN AGRICULTURAL HARVESTER

CROSS-REFERENCE TO RELATED APPLICATION

This application claims priority to European Patent Application No. 21175441.1, filed May 21, 2021, the content of such application being incorporated by reference herein in its entirety.

BACKGROUND OF THE INVENTION

1. Field of the Invention

The present disclosure relates to a cleaning system used in an agricultural harvester, such as a combine, and, more particularly, to a sieve used in such a cleaning system.

2. Description of the Related Art

An agricultural harvester combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

A sieve typically includes a plurality of louvres extending cross-wise between the sides of the sieve, with the louvres including a plurality of fingers which are attached at their rear edge to respective wires. The louvres can be rotated, which in turn opens and closes the spacing between the adjacent rows of fingers. Depending on the crop being harvested, size of the kernels, amount of non-crop matter, etc, the louvre spacing (between the fingers) may need to be adjusted during operation. To that end, the louvres can be connected to at least one adjustment lath which can be moved forward and rearward. The adjustment lath can be connected by way of hinges, levers, etc. to a manual adjustment mechanism, such as a lever at the rear of the sieve which allows an operator to manually adjust the louvre spacing.

It is also known to separate the louvres on sieves into discrete sections of louvers which can be independently adjusted. For example, the upper sieve can be separated into main louvres toward the upstream end of the sieve and extension louvres toward the downstream end of the sieve or vice versa. The extension louvres can be made up, for example, of 10 rows of louvres which can be adjusted to adjust the spacing between the louvres. Likewise, the main louvres consisting of the remaining rows of louvres can be separately adjusted to adjust the spacing between the louvres. The adjustment of both the main louvres and the extension louvres are independent from each other.

SUMMARY OF THE INVENTION

The present disclosure provides an adjustment arrangement for a sieve which simultaneously adjusts an offset spacing between main sieve louvres and extension louvres.

The disclosure in one form is directed to a sieve for use in an agricultural harvester. The sieve includes a framework with a pair of opposed side members. A plurality of louvres extend between the pair of opposed side members. The louvres are arranged in a first set of louvres and a second set of louvres, with each of the first set of louvres and the second set of louvres including a plurality of adjacent louvres overlapped with each other. The second set of louvres are disposed downstream from the first set of louvres relative to an air flow direction through the sieve during operation. The sieve is characterized by a first adjustment lath and a second adjustment lath arranged longitudinally adjacent to each other. The first adjustment lath and the second adjustment lath are movable in fore and aft directions relative to the air flow direction through the sieve. The first adjustment lath is connected with the first set of louvres and the second adjustment lath is connected with the second set of louvres. An adjustment arrangement for adjusting an offset spacing between the first set of louvres and the second set of louvres includes a rotatable elongate element with a longitudinally facing stepped shoulder and at least one stop surface. The elongate element is connected with each of the first adjustment lath and the second adjustment lath. The stepped shoulder includes a plurality of stepped surfaces which are selectively engagable with the at least one stop surface. The stepped surfaces respectively define incremental offset spacings between the first set of louvres and the second set of louvres.

In another embodiment, the elongate element comprises a rod, and a first bushing is carried by the rod and defines the stepped shoulder.

In another embodiment, a second bushing is carried by the rod which interfaces with the first bushing and defines the at least one stop surface. The at least one stop surface includes a plurality of mating stepped surfaces which interface with the stepped surfaces on the first bushing.

In another embodiment, the first bushing includes ramped surfaces between the stepped surfaces, and the second bushing includes ramped surfaces between the mating stepped surfaces.

In another embodiment, the first bushing is mounted to the rod, and the second bushing is mounted to the second adjustment lath.

In yet another embodiment, the adjustment arrangement further includes a spring positioned around the rod and extending between and engaging each of the first adjustment lath and the second adjustment lath, thereby biasing the first adjustment lath and the second adjustment lath away from each other.

In yet another embodiment, the first adjustment lath and the second adjustment lath each include a tube and the rod extends through the tubes, and the spring is positioned between and engages the tubes.

In a further embodiment, the spring is a compression spring.

In a further embodiment, the sieve comprises an upper sieve.

In a still further embodiment, the first set of louvres comprise main sieve louvres and the second set of louvres comprise extension sieve louvres.

In a still further embodiment, a method of operating a sieve in an agricultural harvester is carried out using the adjustment arrangement.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 5 is a side view of the adjustment arrangement shown in FIGS. 3 and 4, with the offset spacing the same between the main louvres and the extension louvres;

FIG. 6 is a side view of the adjustment arrangement shown in FIGS. 3-5, with a maximum offset spacing between the main louvres and the extension louvres.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
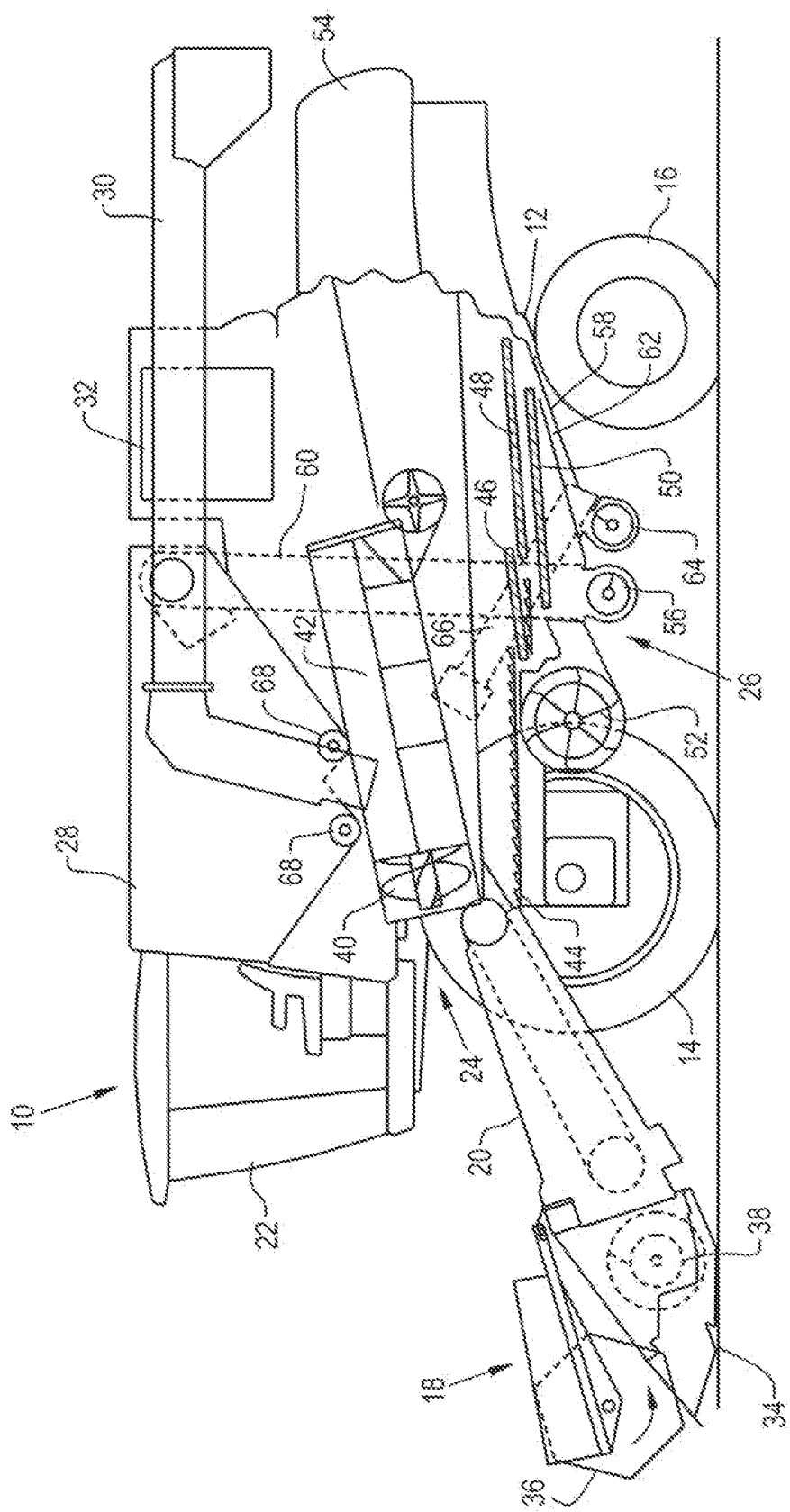
FIG. 1 is a side view of an embodiment of an agricultural harvester in the form of a combine which may include a cleaning system of the present disclosure.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. The upper sieve 48 and lower sieve 50 can be carried within a common framework, and are generally designated together as sieve assembly 100, which will be described in more detail hereinafter. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
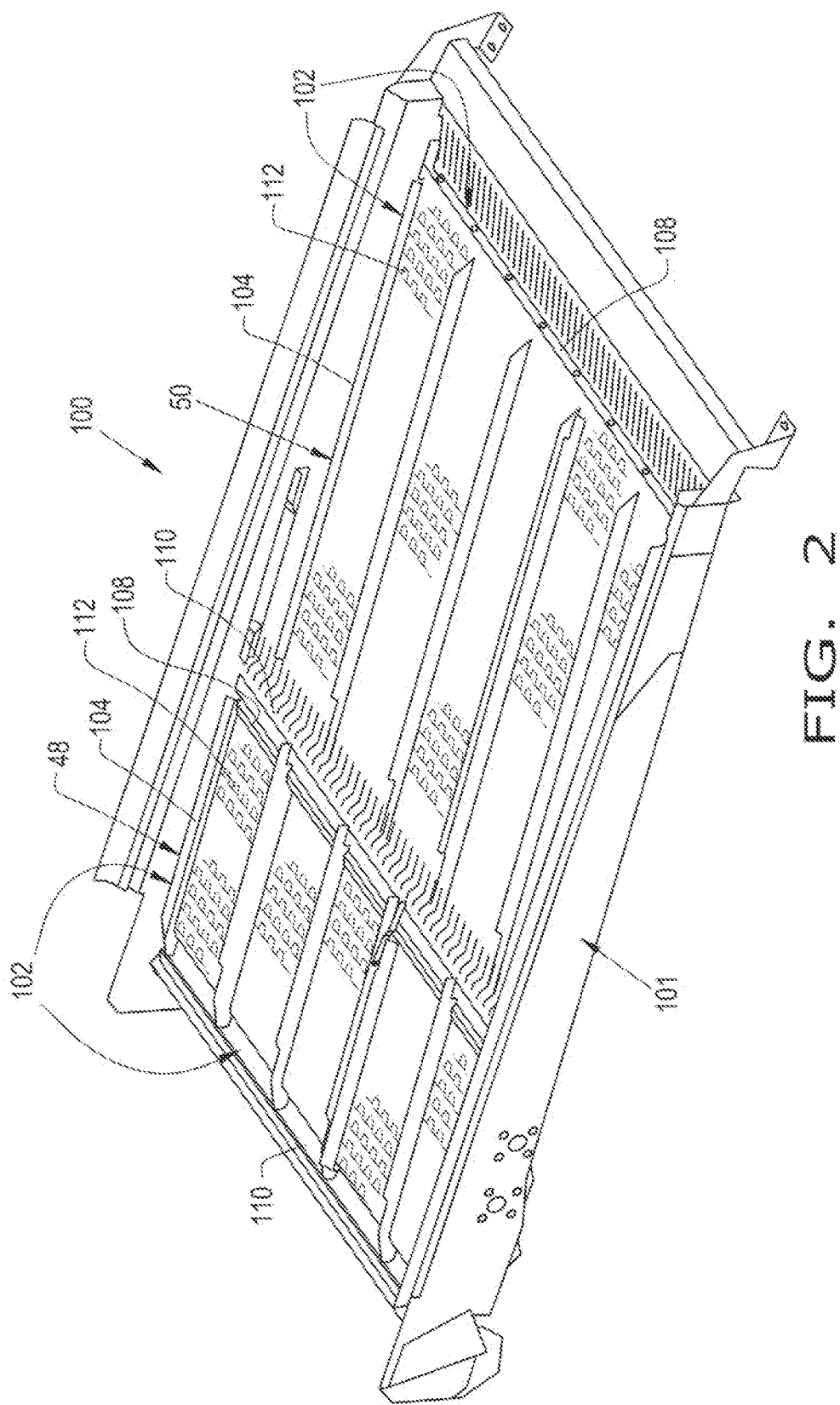
FIG. 2 is a perspective view of an embodiment of a sieve of the present disclosure which can be used in the harvester of FIG. 1.
Figure 3:
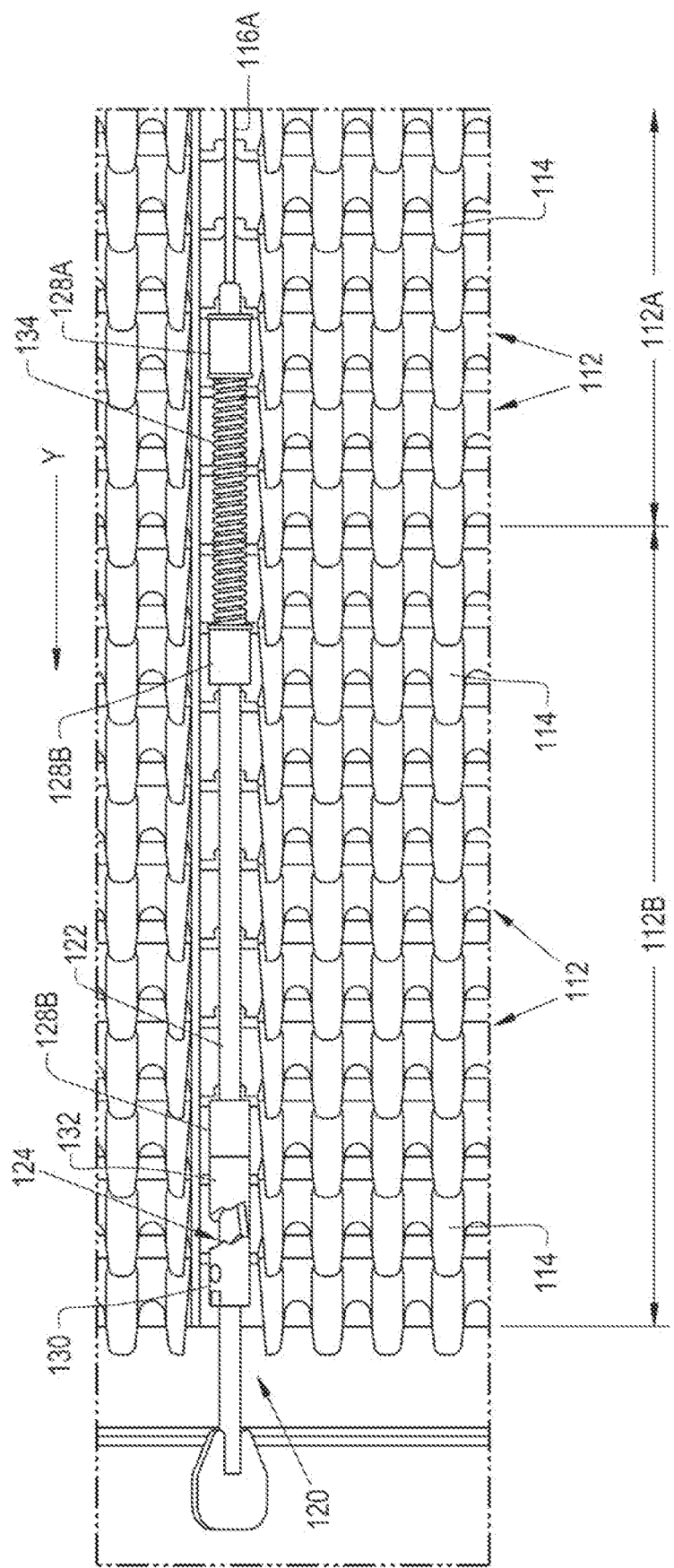
FIG. 3 is a bottom view showing an embodiment of an adjustment arrangement of the present disclosure.

Referring now to FIGS. 2 and 3, the sieve assembly 100 includes a cleaning shoe 101 in which the upper sieve 48 and lower sieve 50 can be removably installed. The upper sieve 48 and lower sieve 50 each generally include a framework 102 with a pair of opposed side members 104 (only one of which is visible for each sieve 48, 50 in FIG. 2). A first cross member 108 extends between the side members 104 at one end of the side members 104 and a second cross member 110 extends between the side members 104 at an opposite end of the side members 104. In the embodiment shown, the first cross member 108 is positioned at the downstream end of the sieve 48 or 50, and the second cross member 110 is positioned at the upstream end of the sieve 48 or 50.

The upper sieve 48 and the lower sieve 50 each include a plurality of louvres 112 (FIGS. 2 and 3; sometimes also referred to as wires) which extend between the pair of opposed side members 104. The louvres 112 are pivotally mounted at opposite ends to the side members 104. Each louvre 112 includes a plurality of fingers 114 which overlap relative to and can be offset from the fingers 114 of adjacent louvres. The spacing between the fingers 114 of adjacent louvres can be adjusted by simultaneously rotating the louvres within the side members 104.

For some applications, it may be desirable to separate or subdivide the louvres of a sieve into discrete sections, relative to the air flow direction Y through the upper sieve. For example, it may be desirable to adjust the louvre spacing differently for different parts of a sieve, based on grain and MOG size, weight, etc. Referring now to FIGS. 3-6, the upper sieve 48 can be separated into two or more sections or groups of louvres 112A, 112B relative to the air flow direction Y through the upper sieve 48. The extension louvres 112B are assumed to be defined by the last 10 rows of louvres, at the downstream end of the upper sieve 48. The extension louvres 112B could be defined by a different number of louvres, such as the last 8 or 11 rows of louvres. The main louvres 112A are defined by the remaining louvres of the upper sieve 48, and are located upstream from the extension louvres 112B. In an alternative embodiment the main louvres 112A can be positioned downstream of the extension louvres 112B. The spacing between the main louvres 112A and the extension louvres 112B are adjusted dependent on each other, and have an offset spacing X, as will be described in more detail hereinafter. For purposes of discussion herein, the main louvres 112A are assumed to define a first set of louvres, and the extension louvres 112B are assumed to define a second set of louvers.

Figure 4:
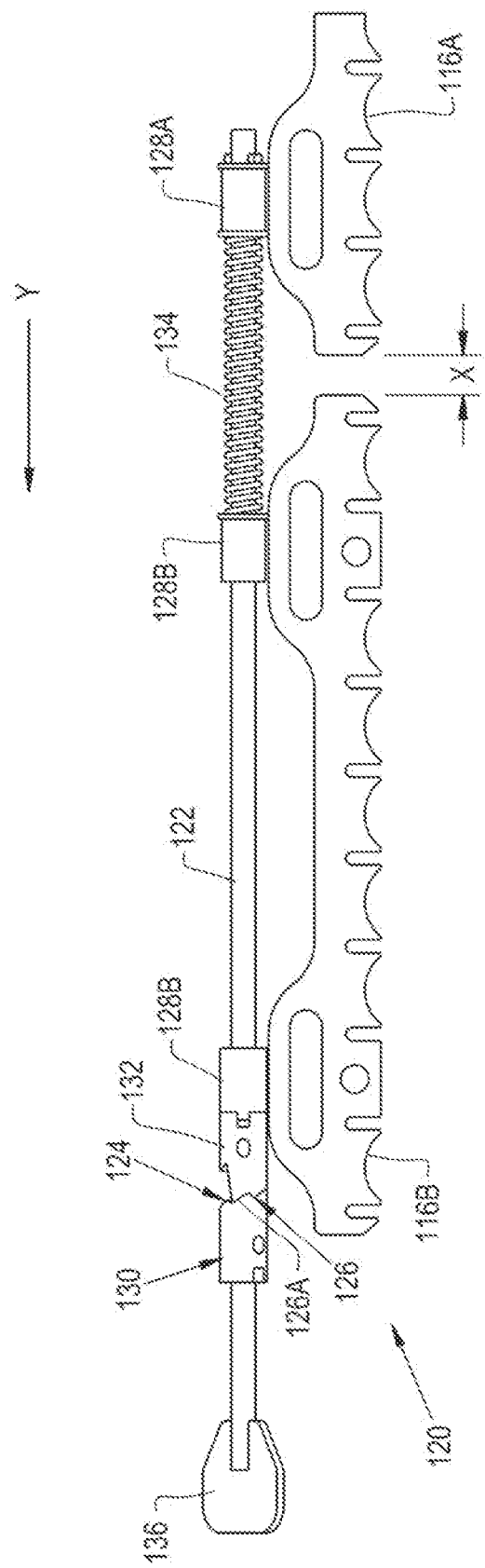
FIG. 4 is a side view of the adjustment arrangement shown in FIG. 3.

Referring now to FIGS. 4-6, a first adjustment lath 116A and a second adjustment lath 116B are arranged longitudinally adjacent to each other, with the first adjustment lath 116A and the second adjustment lath 116B being movable in fore and aft directions relative to the air flow direction Y through the sieve 48. The first adjustment lath 116A is connected with the first set of louvres 112A and the second adjustment lath 116B is connected with the second set of louvres 112B.

An adjustment arrangement 120 for adjusting the offset spacing X between the first set of louvres 112A and the second set of louvres 112B is positioned below the upper sieve 48. The adjustment arrangement 120 includes a rotatable elongate element 122 with a longitudinally facing stepped shoulder 124 and at least one stop surface 126. The elongate element 122 can be in the form of a rod which is connected with each of the first adjustment lath 116A and the second adjustment lath 116B. In the illustrated embodiment, the first adjustment lath 116A includes a single tube 128A through which the rod 122 extends. Likewise, the second adjustment lath 116B includes two tubes 128B through which the rod 122 extends.

Figure 7:
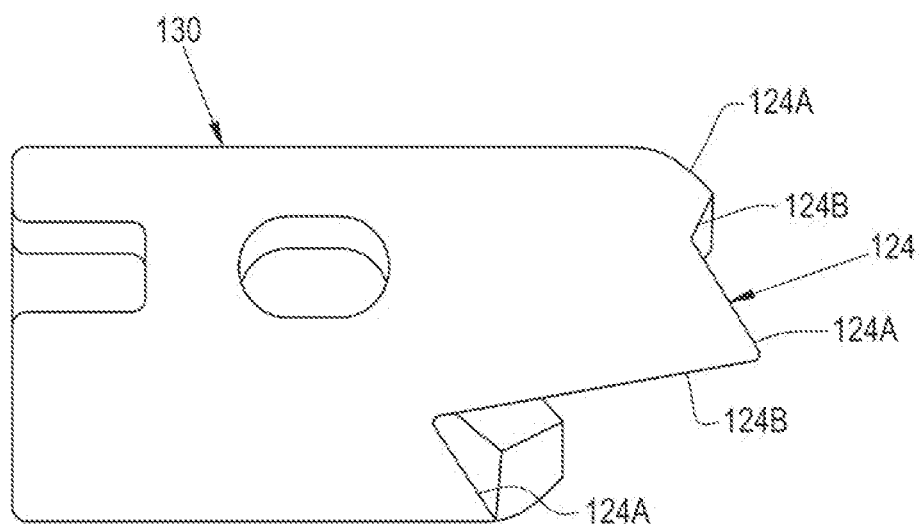
FIG. 7 is a perspective view of a bushing forming part of the adjustment arrangement shown in FIGS. 3-6.

A first bushing 130 (FIGS. 3-7) carried by the rod 122 defines the stepped shoulder 124. The first bushing 130 can be immovably fixed to the rod 122, such as by pinning, welding, etc. The stepped shoulder 124 includes a plurality of stepped surfaces 124A (FIG. 7) which are selectively engageable with the at least one stop surface 126. The stepped surfaces 124A respectively define incremental offset spacings between the first set of louvres 112A and the second set of louvres 112B. The first bushing 130 also includes ramped surfaces 124B between the stepped surfaces 124A. The ramped surfaces 124B allow the first bushing 30 to be rotated to a selected position such that a selected stepped surface 124A engages with the one or more stop surfaces 126.

A second bushing 132 is also carried by the rod 122. The second bushing 132 interfaces with the first bushing 130 and defines the at least one stop surface 126. In the embodiment shown, the second bushing 132 is slidable on the rod 122 and has a notched end which engages with a projection on the tube 128B of the second adjustment lath 116B, thereby making the second bushing 132 non-rotatable relative to the second adjustment lath 116B. The at least one stop surface 126 defined by the second bushing 132 includes a plurality of mating stepped surfaces 126A which interface with the stepped surfaces 124A on the first bushing 130. The second bushing 132 also includes ramped surfaces (not numbered) between the mating stepped surfaces 126A.

The adjustment arrangement 120 further includes a spring 134 positioned around the rod 122. The spring 134 extends between and engages each of the first adjustment lath 116A and the second adjustment lath 116B, thereby biasing the first adjustment lath 116A and the second adjustment lath 1168 away from each other. In the illustrated embodiment, the spring 134 is configured as a compression spring which is positioned between and engages the tubes 128A and 128B.

In the embodiment of the adjustment arrangement 120 shown and described above, the adjustment arrangement is used in conjunction with the upper sieve 48. However, it is to be understood that the adjustment arrangement 120 could be used with a different sieve where it is desired to provide an offset spacing between sections of louvres. For example, it may be possible to use the adjustment arrangement 120 with the pre-sieve 46 or the lower sieve 50.

Furthermore, in the embodiment of the adjustment arrangement 120 shown and described above, the second bushing 132 defines mating stepped surfaces which interface with the stepped surfaces of the first bushing 130. However, it may also be possible to eliminate the second bushing 132 and form the mating stepped surfaces as part of the axial face of the adjoining tube 128B.

During operation, the adjustment arrangement 120 can be manually adjusted by rotating the handle 136 attached to the end of the rod 122. Alternatively, rod 122 can be rotated by an electric or hydraulic motor instead of handle 136 and can be remotely controlled. Referring to FIG. 5, the offset spacing X can be adjusted such that the spacing between the main louvres 112A is the same as the spacing between the extension louvres 112B (i.e., the fingers 114 of the extension louvres 112B are at the same angular orientation as the fingers 114 of the main louvres 112A). The offset spacing X can be selectively adjusted anywhere up to a maximum offset spacing, shown in FIG. 6.

Whenever the first adjustment lath 116 is moved towards its rearmost position rotating the main louvres 112A towards an extreme position, at some point in the movement the maximum offset spacing X is not possible anymore. Compression of the spring 134 covers the reduction of this offset spacing X.

What is claimed is:

1. A sieve for use in an agricultural harvester, the sieve comprising:
    a framework including a pair of opposed side members;
    a plurality of louvres extending between the pair of opposed side members, the louvres being arranged in a first set of louvres and a second set of louvres, each of the first set of louvres and the second set of louvres including a plurality of adjacent louvres overlapped with each other, the second set of louvres being disposed downstream or upstream from the first set of louvres relative to an air flow direction (Y) through the sieve during operation;
    a first adjustment lath and a second adjustment lath arranged longitudinally adjacent to each other, each of the first adjustment lath and the second adjustment lath being movable in fore and aft directions relative to the air flow direction (Y) through the sieve, the first adjustment lath being connected with the first set of louvres such that the first set of louvres is carried on the first adjustment lath and the second adjustment lath being connected with the second set of louvres such that the second set of louvres is carried on the second adjustment lath; and
    an adjustment arrangement for adjusting an offset spacing (X) between the first adjustment lath and the second adjustment lath, the adjustment arrangement including a rotatable elongate element with a longitudinally facing stepped shoulder and at least one stop surface, the elongate element being connected with each of the first adjustment lath and the second adjustment lath such that rotation of the elongate element adjusts the offset spacing (X) between the first adjustment lath and the second adjustment lath, the stepped shoulder including a plurality of stepped surfaces which are selectively engageable with the at least one stop surface, the stepped surfaces respectively defining incremental offset spacings (X) between the first adjustment lath and the second adjustment lath.

2. The sieve of claim 1, wherein the elongate element comprises a rod, and further including a first bushing carried by the rod and defining the stepped shoulder having the plurality of stepped surfaces.

3. The sieve of claim 2, further including a second bushing carried by the rod which interfaces with the first bushing and defines the at least one stop surface, the at least one stop surface includes a plurality of mating stepped surfaces which interface with the stepped surfaces on the first bushing.

4. The sieve of claim 3, wherein the first bushing includes ramped surfaces between the stepped surfaces.

5. The sieve of claim 4, wherein the first bushing is mounted to the rod, and the second bushing is mounted to the second adjustment lath.

6. The sieve of claim 2, wherein the adjustment arrangement further includes a spring extending between and engaging each of the first adjustment lath and the second adjustment lath, thereby biasing the first adjustment lath and the second adjustment lath away from each other.

7. The sieve of claim 6, wherein the first adjustment lath and the second adjustment lath each include a tube and the rod extends through the tubes, and the spring is positioned between and engages the tubes.

8. The sieve of claim 6, wherein the spring is a compression spring.

9. The sieve of claim 1, wherein the sieve is an upper sieve.

10. The sieve of claim 1, wherein the first set of louvres comprise main sieve louvres and the second set of louvres comprise extension sieve louvres.

11. An agricultural harvester comprising the sieve of claim 1.

* * * * *